June 1, 1965  D. W. BOTSTIBER  3,186,549
LIQUID FILTERING DEVICE WITH INDICATING MEANS
Filed July 6, 1961  2 Sheets-Sheet 1

INVENTOR.
DIETRICH W. BOTSTIBER
BY Albert Sperry.
ATTORNEY

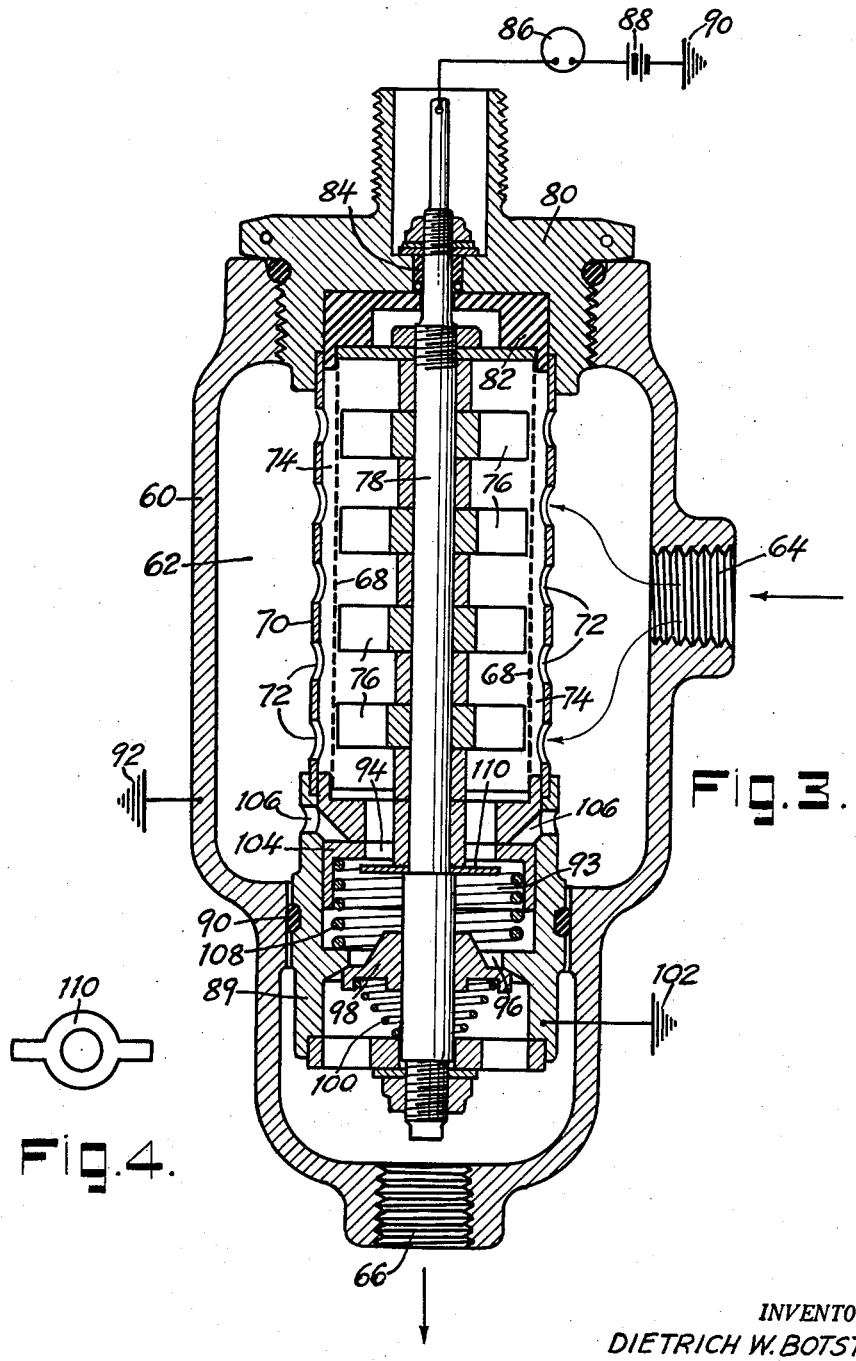

United States Patent Office 3,186,549
Patented June 1, 1965

3,186,549
LIQUID FILTERING DEVICE WITH
INDICATING MEANS
Dietrich W. Botstiber, 307 S. Chester Pike,
Glenolden, Pa.
Filed July 6, 1961, Ser. No. 122,156
3 Claims. (Cl. 210—86)

This invention relates to filters adapted to be used in oil or other liquid systems and is directed particularly to filters which embody magnetic means together with pressure sensitive means and indicating means responsive to the presence or accumulation of excessive or undesired material on the filter.

Various types of filters have been designed heretofore through which all of the oil or liquid in a system may be passed so as to effect a positive removal of objectionable material from the liquid being circulated. In some instances, such filters also have included magnetic elements for attracting and retaining particles of paramagnetic material. However, whenever filtering elements and magnetic elements have been used together heretofore, they have functioned independently, allowing some of the particles to become lodged either in the magnetic section or on the strainer section. Thus, the existing constructions have not been designed or capable of use with electrical means or a signalling circuit so as to give a reliable indication of the presence of a large particle or an excessive accumulation of material. Furthermore, previously designed constructions are not capable of effecting an electrical signal if the filter becomes excessively contaminated with particles of electrically non-conductive nature.

In my issued Patent No. 2,936,890, a magnetic chip detector is provided which serves to give an indication of the presence of large or excessive amounts of paramagnetic materials. However, such detectors are generally located in an oil sump or in other quiescent areas of a system and are not designed or capable of filtering out non-magnetic materials. As a result, such magnetic detecting means do not provide for the positive retention of material but serve only to collect and respond to those magnetic or conducting particles which may settle out of the oil or pass into close proximity to a magnetic element in the device.

In accordance with the present invention, these objections and limitations of filtering devices of the prior art are overcome and means are provided for effecting the positive filtering of all of the liquid in a system and for indicating the presence of large or objectionable amounts of conducting or non-conducting material on the filter. The device of the present invention is further designed so as to increase the effectivness thereof in attracting paramagnetic materials as they accumulate on the filtering elements.

These results are preferably attained by providing a novel combination of elements including a screen or filtering member through which all of the liquid to be filtered may be passed so as to effect the positive removal of objectionable material from the liquid. The invention further includes magnetic elements which establish a magnetic field extending transversely across the path of flow of liquid being filtered and are included in an electrical circuit responsive to the presence of large particles or objectionable amounts of conducting material on the filter. When using such a combination of elements, the accumulation of paramagnetic material on the screen and adjacent the magnetizable elements serves to increase the magnetic flux between the elements and enhances the action thereof in attracting magnetizable particles of material. As a result, the liquid is positively filtered and the accumulation of magnetizable particles is rendered more effective and is localized so that it may be utilized to indicate the need to clean the filter. The assembly may further include means responsive to an excessive accumulation of material on the filter whether or not such material is of a magnetizable or conducting character.

Accordingly, one of the objects of the present invention is to improve the operation of filtering devices embodying magnetic elements.

A further object of the present invention is to provide a filtering device having a positive filtering action with means adapted to indicate the need for cleaning of the filter.

A specific object of the present invention is to provide a filter for liquids which includes magnetic elements establishing a magnetic field extending transversely of the path of flow of the liquid being filtered and included in an electrical indicating circuit.

These and other objects and features of the present invention will appear from the following description thereof wherein reference is made to the figures of the accompanying drawing.

In the drawing:

FIG. 3 is a longitudinal sectional view through an alternative form of the invention; and FIG. 4 is a plan view of an element of the assembly of FIG. 3.

Figure 1:
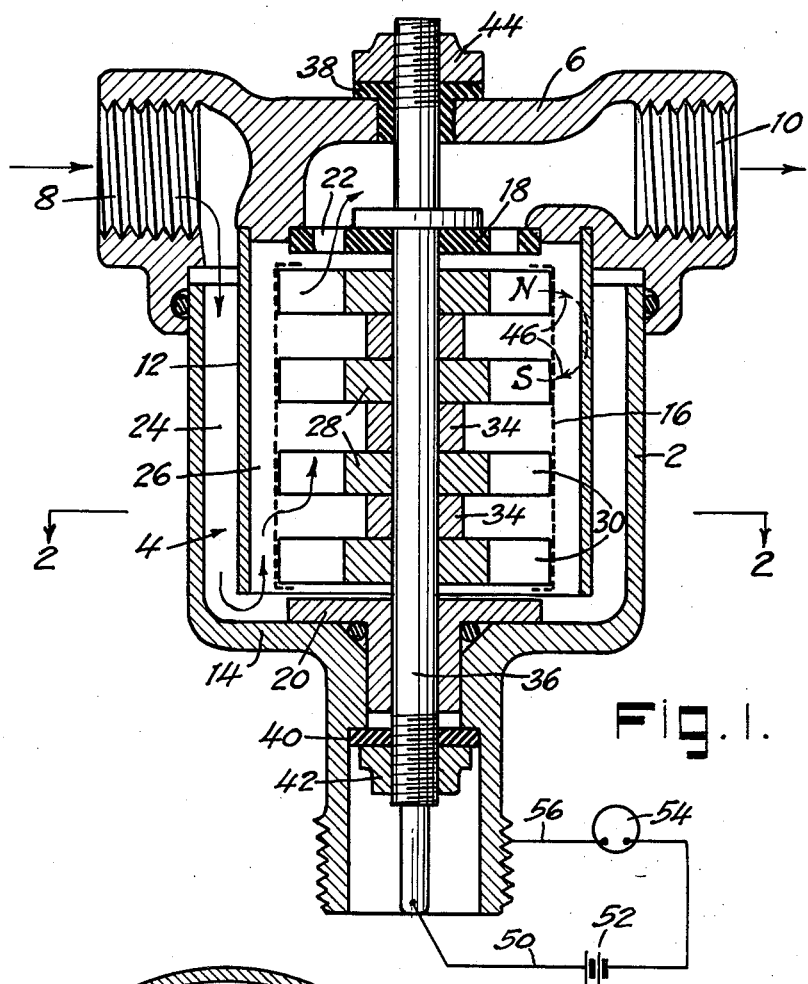
FIG. 1 is a longitudinal sectional view through a typical form of filter embodying the present invention.
Figure 2:
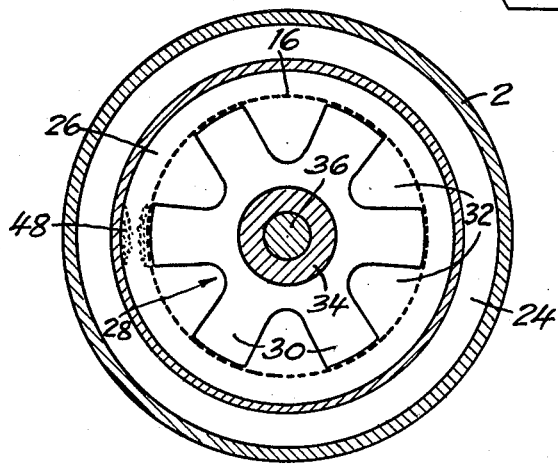
FIG. 2 is a transverse sectional view of the filter shown in FIG. 1 taken on the line 2—2 thereof.

In that form of the invention chosen for purposes of illustration in FIGS. 1 and 2 of the drawings, the filter unit is provided with a housing 2 having a chamber 4 therein which is closed by a cover member 6. The cover member has an inlet 8 through which the oil or liquid to be filtered passes into the chamber 4 and has an outlet 10 from which the filtered liquid is discharged. A cylindrical sleeve 12 is carried by the cover member 6 and extends downward therefrom to a point spaced a substantial distance from the bottom 14 of the housing 2 so as to provide an annular liquid inlet to the filtering elements surrounded by the sleeve 12.

The housing 2 and cover 6 may be formed of any suitable metal but are preferably formed of a metal such as brass or aluminum having a low magnetic permeability. However, the sleeve 12 is preferably formed of paramagnetic material such as soft iron, steel or other ferrous metal.

The filtering elements preferably include a cylindrical screen 16 which will ordinarily be formed of metal or other electrically conducting material. Thus, magnetizable material such as a ferrous metal may be used or non-magnetic material such as brass or aluminum can be employed. The upper end of the screen 16 is held in place adjacent the lower surface of an electrically insulating top plate 18 carried by cover 6 whereas its lower end is held in place adjacent the upper surface of an insulating bottom plate 20 carried by the bottom 14 of the housing. The top plate 18 is provided with openings 22 which communicate with the interior of the cylindrical screen 16 and with the outlet 10 in the cover member 6. The steel sleeve 12 is preferably located closer to the screen 16 than to the housing 2 and cooperates with the housing to form an outer passage 24 through which the liquid to be filtered passes downward from the inlet 8 to the bottom of the chamber 4. The liquid then flows inward and upward on the interior of the steel sleeve 12 through the passage 26 between the sleeve and the screen 16 and is filtered by its passage through the openings in the screen. In this way, the particles filtered from the liquid are held on the exterior of the screen by the pressure of the liquid flowing through the opening in the screen. From the interior of the cylindrical screen 16 the liquid passes upward through the openings 22 in the top plate 18 to the outlet 10 in cover member 6. As a result, all of the liquid passing through the device is positively filtered and both magnetizable and non-magnetizable particles are removed from the liquid and held in contact with the outer surface of the screen.

In order further to assure the removal of paramagnetic particles such as iron or steel from the liquid and to localize accumulations thereof, the device is provided with magnetic elements positioned within the cylindrical screen 16 and cooperating with the steel sleeve 12 to establish a magnetic field extending across the passage 26 between the sleeve and screen 16. For this purpose, the magnetic elements are preferably in the form of plates 28 provided with spaced arms 30 having openings 32 therebetween through which the filtered liquid may flow to the outlet 10. The plates are held in spaced relation by the metal spacing members 34 and are secured in place by a metal rod 36. Rod 36 extends upward through the insulating top plate 18 and through the cover member 6 and is electrically insulated from the cover member by the non-conducting bushing 38. In a similar way, the lower end of rod 36 passes downward through the insulating bottom plate 20 and is insulated from the housing 2 by a non-conducting washer 40. Nuts 42 and 44 applied to the ends of rod 36 secure the elements of the assembly in place.

The magnetic elements 28 are preferably formed of a magnetized material such as the alloy known as "Alnico" and the extremities of the arms 30 thereof serve as pole pieces which are positioned directly adjacent or in contact with the inner surface of the cylindrical screen 16. The extremities of the arms 30 are thus spaced only a relatively short distance from the steel sleeve 12 corresponding to the width of the passage 26 between the sleeve and the screen. The extremities of the arms 30 of adjacent plates 28 in the assembly may then be oppositely polarized as indicated by the letters N and S on the two upper plates of the assembly as seen in FIG. 1. Furthermore, if desired, the plates 28 may be spaced apart a distance greater than the width of the passage 26.

The magnetic flux, seeking the path of greatest permeability, will then flow from the pole N of the uppermost plate 28 across the passage 26 to the steel sleeve 12 and through the sleeve to a point opposite the pole S of the second magnetized plate 28 in the assembly and then back across the passage 26 to pole S of the second plate as indicated by the arrows 46. In this way, two magnetic fields extending transversely of the direction of flow of the liquid will be established and paramagnetic particles will be attracted to either the steel sleeve or the surface of the screen 16 adjacent the extremities of the arms 30 of the magnetic elements 28. Moreover, as such magnetizable particles build up on the sleeve and screen, the gap between the accumulated particles at the opposite sides of the passage 26 will decrease. The magnetic reluctance will thus be decreased and the intensity of the field will be increased whereby the attraction for magnetizable particles in the liquid being filtered will become greater. The efficiency of the magnetic filtering means will thus actually increase as the accumulation of particles thereon is increased.

The magnetic filtering means thus provided further tends to localize the accumulations of metallic and electrically conducting particles as shown at 48 in FIG. 2. This characteristic of the filtering means is utilized in accordance with the present invention to actuate a signal or other indicating means upon excessive accumulation of material on the filter screen. For this purpose, the rod 36, which is electrically connected to the magnetic elements 28 but insulated from the housing 2 and cover 6, is connected to conductor 50 which leads to a source of electric current 52 and a signal or indicating device 54. The opposite side of the indicating device 54 is connected to the housing 2 (or cover 6) by a conductor 56. With this arrangement of means, the indicating device 54 will be actuated whenever an electrically conducting particle or an accumulation of such particles completes a conducting path for the flow of current across the passage 26 from the steel sleeve 12 to one of the magnetic elements 28. Moreover, the localized accumulation of the metallic particles produced by the magnetic elements serves to assure the creation of an electrically conducting path more quickly than would be the case if the metallic particles were merely filtered out and distributed uniformly in a thin layer over the entire surface of the filter. The sensitivity of the system is thus increased and a signal will be given before dangerous clogging of the filter or a damaging situation can develop.

In producing and assembling the magnetic elements of the present invention, the spacing members 34 may be formed of magnetic material having opposite poles at the upper and lower ends thereof and the plate-like elements 28 may be formed of soft iron or other material having a high magnetic permeability. In a similar way, the sleeve 12 may be formed of soft iron or other magnetically permeable material as desired.

The screen 16 is preferably made of electrically conducting material and may be formed of ferrous metal or other magnetizable material in which case magnetic flux will traverse both the metal of the screen and the space 26 between the screen 16 and the cylindrical member 12. In the alternative, the screen 16 may be formed of non-magnetizable metal such as brass or aluminum in which case the screen will not be included in the magnetic circuit but will be electrically connected to the indicating device. In any event, localized areas of intense magnetization will be provided for building up the accumulations of magnetizable material relatively rapidly and in a manner to bridge the space 26 and establish a conducting path for actuating the indicating means 54.

In that form of the invention shown in FIGS. 3 and 4, the filter device is further provided with flow responsive means adapted to be connected with indicating means to give an alarm or other indication whenever the flow through the device is faulty.

As shown in FIG. 3, the filter device is provided with a housing 60 having a chamber 62 therein with an inlet opening 64 and an outlet opening 66. A cylindrical screen 68 is located in the chamber between the inlet and the outlet so that positive filtering of all liquid passing from the inlet to the outlet is assured. The sleeve 70 which surrounds the screen 68 is formed with openings 72 so that liquid may pass through the sleeve to the screen. The sleeve is formed of steel or other magnetically permeable material and is spaced from the screen to form a passage 74 as in that form of the invention illustrated in FIGS. 1 and 2. Similarly, the assembly includes magnetic elements 76 located within the cylindrical screen for cooperation with the sleeve 70 to establish a magnetic field extending transversely across the passage 74. The magnetic elements 76 are held in place by an electrically conducting rod 78 which extends axially through the cylindrical screen 68 and is insulated from the housing and the end plug 80 thereof by the electrically insulating plate 82 and bushing 84.

Indicating means 86 are connected to the source of current 88 and to ground at 90 whereas the housing 60 is grounded as indicated at 92. Thus, the magnetic elements of the filter device will operate as described above in connection with that form of the invention shown in FIGS. 1 and 2 to complete a circuit through the indicating means upon a predetermined accumulation of conducting material in the space between the screen 68 and sleeve 70.

In order that the indicating means 86 may be actuated in response to other conditions affecting the filter device, a valve unit 89 is located in the chamber 62 and is electrically insulated from the housing 60 by insulating means such as a rubber O-ring 90 or the like. The valve unit has a cavity 93 therein which communicates at one end with the interior of the cylindrical screen 68 through openings 94 and communicates at the opposite end with the outlet opening 64 through the opening 96.

A check valve 98 is urged into position to close the opening 96 by a relatively light spring 100 but is movable in response to liquid pressure to permit normal flow of liquid through the filter. The check valve 98 is formed of metal and is slidably movable along the rod 78. The valve unit 89 is grounded as indicated at 102 so that when the check valve is closed and engages the valve unit 89, it will serve to complete a circuit through the rod 78 and indicating means 86. In this way, the check valve will serve to actuate the indicating means whenever the liquid pressure fails or is not applied, or in the event back pressure on the liquid should occur.

The valve unit 89 also has a pressure responsive valve 104 which normally closes pressure relief ports 106 which extend from the cavity 93 in the valve unit to points outside of the screen 68. This valve is urged into position to close the pressure relief ports 106 by means of a relatively strong spring 108. The valve 104 is also formed of metal and when opened engages a contact element 110 carried by the rod 78.

With this construction, clogging or an excessive accumulation of any material, whether conducting or non-conducting, on the screen 68 will cause excessive pressure to build up on the exterior of the screen. This pressure will be relieved by the movement of valve member 104 to open the pressure relief ports 106. However, such movement of the valve member 104 will cause it to engage the contact element 110 on rod 78 and complete a circuit through the indicating means 86.

The construction thus provided serves to assure operation of the indicating means whenever improper liquid flow or filter operation takes place. The filter, therefore, serves as a safety device which protects the filter as well as the system in which it is included by affording an indication of improper operation under any conditions of usage.

The number, size, shape and arrangement of the members included in the magnetic and electrical circuits of the assembly may obviously be varied as desired and the form and construction of the chamber, screen or other elements of the combination can be modified or adapted in order to employ the invention in other forms and types of liquid filtering systems.

In view thereof, it should be understood that the particular embodiment of the invention which has been shown in the drawing and described above is intended to be illustrative only and is not intended to limit the scope of the invention.

I claim:
1. A filter for liquids comprising:
   (a) a housing having an inlet and an outlet;
   (b) a cylindrical sleeve of high magnetic permeability mounted in the housing in position to define a flow passage between the inlet and outlet, one end of the sleeve communicating with said inlet;
   (c) a cylindrical, liquid-pervious filter element mounted within and electrically insulated from the sleeve in concentric, spaced relation thereto, said element and sleeve defining therebetween, at said one end of the sleeve, an annular entrance opening for a liquid to be filtered, the other end of the sleeve being closed and said outlet communicating solely with the interior of the filter element to require passage of a liquid to be filtered through the wall of the filter element and longitudinally of and within the filter element toward the outlet, after flow of the liquid through the entrance opening;
   (d) a series of permanent magnets centered in the filter element, each magnet including a plurality of radial arms terminating at the wall of and aligned longitudinally of the filter element, said arms of each magnet being uniformly, angularly spaced about the circumference of the filter element to define, in alternating relation thereto, corresponding straight, unobstructed flow paths extending from end to end of the filter element in paths paralleling the axis of the filter element, the extremities of corresponding, aligned arms of the several magnets providing substantially continuous lines of magnetic flux lying longitudinally of and within the space between the filter element and sleeve along straight paths paralleling the flow paths and alternating with the same circumferentially of the filter element; and
   (e) an electrical signalling circuit one side of which is electrically connected to the sleeve and the other side of which is electrically connected to the filter element, said circuit including a signal device and a source of electric power, said circuit closing in response to bridging of the space between the filter element and sleeve by an accumulation of paramagnetic particles occurring in any one of said paths of magnetic flux.

2. A filter for liquids as in claim 1 wherein said magnets are spaced axially of the filter element.

3. A filter for liquids as in claim 1 wherein said extremities of corresponding, aligned arms of the magnets alternate between opposite polarities longitudinally of the filter element.

References Cited by the Examiner

UNITED STATES PATENTS

| 2,328,131 | 8/43 | Eisler | 210—90 |
| 2,349,992 | 5/44 | Schrader | 210—85 X |
| 2,450,630 | 10/48 | Bourne | 210—222 X |
| 2,462,715 | 2/49 | Booth | 210—222 X |
| 2,652,925 | 9/53 | Vermeiren | 210—222 |
| 2,825,464 | 3/58 | Mack | 210—222 |
| 2,887,230 | 5/59 | Sicard | 210—222 |
| 2,936,890 | 5/60 | Boistiber | 210—86 |

FOREIGN PATENTS

| 1,183,592 | 7/59 | France. |
| 1,016,878 | 10/57 | Germany. |
| 844,709 | 8/60 | Great Britain. |

REUBEN FRIEDMAN, *Primary Examiner.*

EUGENE BLANCHARD, HARRY B. THORNTON, *Examiners.*